INVENTOR
R. T. DENTON

United States Patent Office 3,462,212
Patented Aug. 19, 1969

3,462,212
POLYCHROMATIC BEAM DEFLECTION
Richard T. Denton, South Plainfield, N.J., assignor to Bell Telephone Laboratories, Incorporated, New York, N.Y., a corporation of New York
Filed Oct. 18, 1965, Ser. No. 497,296
Int. Cl. G02f 1/28, 1/36; G02b 5/18
U.S. Cl. 350—160   3 Claims

ABSTRACT OF THE DISCLOSURE

A polychromatic diffraction cell of the Debye-Sears type in which the tilt of a front surface of the cell is chosen to utilize the frequency varying nature of the index of refraction of the cell material to compensate the dispersion of the diffraction mechanism and in which the tilt of a back surface is utilized to realign the components into a collimated beam.

---

This invention relates to beam deflection systems and more particularly to broadband or polychromatic optical beam deflection systems.

Extensive consideration is now being given to the use of variable diffraction gratings for deflecting a light beam in response to an electrical control signal. These gratings, similar to the Debye-Sears cells of classical optics, comprise a light transparent medium which is disturbed by the passage of waves of some form of energy to produce a periodic variation of the index of refraction of the medium. Light directed through the cell is diffracted as a function of the ratio of the wavelength of the light to the wavelength of the disturbing wave.

Diffraction cells of different composition and disturbing waves of different forms have been proposed. In all combinations, however, the diffraction mechanism is inherently dispersive, that is, different frequency components in the beam are deflected by slightly different amounts. If the beam is monochromatic no problem is presented. Polychromatic deflection is, however, required in image reproduction systems which use white light or in optical communications systems where multifrequency beams are required.

It is, therefore, an object of the present invention to deflect a broadband optical beam.

It is a further object of the present invention to apply color compensation to optical diffraction cells of the Debye-Sears type.

In accordance with the invention the dispersion produced by the frequency varying nature of the index of refraction of the material comprising the diffraction cell is employed to compensate the dispersion inherent in the diffracting mechanism itself. This same index of refraction is then employed to realign the components at each frequency into a collimated beam. Specifically, the opposite faces through which the beam enters and leaves the diffraction cells are cut with specific angles to each other, to the plane of the diffraction grating, and to the path of the entering optical beam to produce substantially complete color compensation over the frequency range in which the index of refraction of the material from which the cell is formed varies substantially linearly with frequency.

Figure 1:
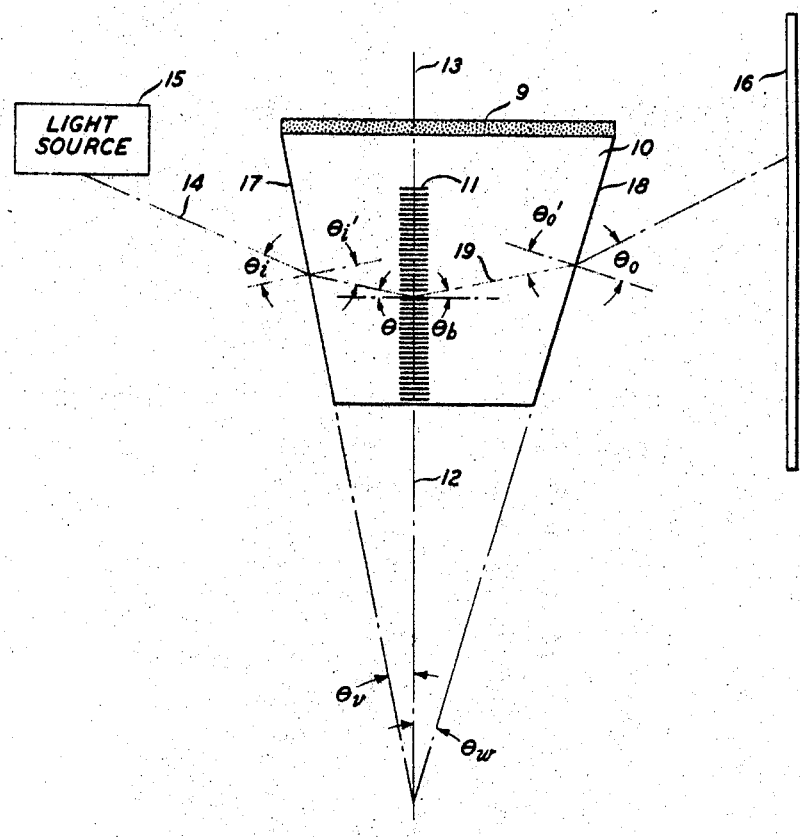
Figure 2:
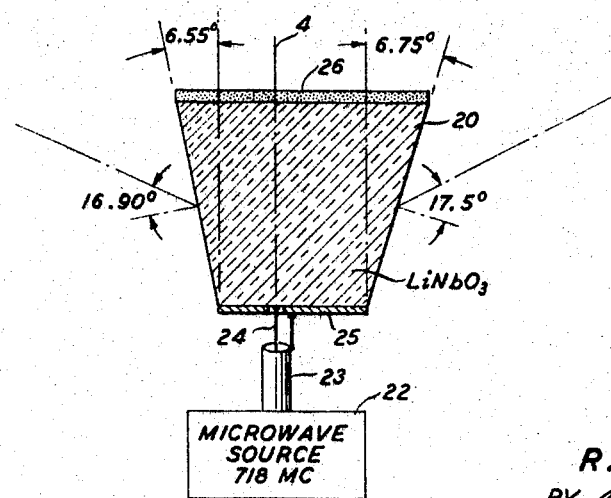

These, and other objects and features, the nature of the present invention and its various advantages, will appear more fully upon consideration of the specific illustrative embodiments shown in the accompanying drawings and described in detail in the following explanation of these drawings, in which:

FIG. 1 is a schematic representation of a generalized diffraction cell corrected in accordance with the invention; and FIG. 2 is a plane view of a specifically corrected deflection system employing a body of lithium metaniobate.

Referring more particularly to FIG. 1, a schematic representation of a generalized polychromatic light deflector is shown. Body 10 represents the diffraction cell comprising a material which is relatively transparent to light at the frequencies of interest and which has an index of refraction which varies with frequency. This index of refraction is further modifiable to form a diffraction grating by energy schematically applied by vector 12, propagating along axis 13 and producing the periodic striations schematically represented by the lines 11 normal to axis 13. Body 9 represents an absorber upon the face of body 10 opposite vector 12 which dissipates without reflection any part of the energy reaching the absorber so that striations 11 move in one direction only through body 10.

Body 10 and vector 12 may take several different forms, for example, body 10 may be a material having a high elasto-optic coefficient such as quartz or titanium oxide (rutile) in which case the vector 12 represents a suitable source of elastic wave energy and body 13 represents an acoustical absorber according to the combination disclosed in Patent 3,174,044, granted Mar. 16, 1965 to P. K. Tien. Striations 11 then comprise the interfaces between regions of high and low density produced by the elastic wave.

On the other hand, body 10 may be a material having a high electro-optic coefficient such as potassium-tantalate-niobate, in which case the vector 12 represents means for impressing the electric field of an electromagnetic wave propagating through body 10 as in the combination disclosed in the copending application of E. I. Gordon, Ser. No. 377,353, filed June 23, 1964. Alternatively, body 10 may be a material having a high magneto-optic coefficient such as yttrium iron garnet, in which case the vector 12 represents means for launching magneto-elastic spin waves therein according to the teachings found in the copending aplication of J. F. Dillon et al., Ser. No. 465,119, filed June 18, 1965.

In accordance with a preferred embodiment, however, body 10 comprises a material having both a high piezoelectric constant and a high elasto-optic coefficient such as lithium metaniobate. In such an embodiment vector 12 represents a suitable electric field applied at a surface of body 10 as described in the copending application of Lenzo et al., Ser. No. 483,259, filed Aug. 27, 1965. As in the first-mentioned form, striations 11 represent interfaces between variations in density produced by elastic waves generated at the surface by the electric field. A detailed description of an embodiment of this type will be considered hereinafter in connection with FIG. 2 and it will now be assumed that FIG. 1 schematically represents this form for the purpose of explanation even though the principles of the invention apply regardless of the composition of body 10 and the nature of the disturbance therein.

Thus beam 14 from optical source 15 enters body 10 at an angle $\theta$ to the normal to the plane of the diffraction grating formed by striations 11 which plane passes through the axis 13 representing the direction of propagation of the elastic wave. The beam is then deflected according to the Debye-Sears diffraction phenomena and leaves body 10 to impinge upon object plane 16. The angle between the deflected beam and the normal to the plane of the diffraction grating is again substantially $\theta$ or between the deflected beam and the original beam path of $2\theta$. Object plane 16 constitutes an array of light sensitive storage devices, an array of photosensitive switching elements, a coding plate, a viewing screen, or any assembly of other optical devices.

An analysis of the Debye-Sears diffraction phenomena may be found in any standard optical textbook, for example, see "Principles of Optics," Born and Wolf, 1964. Briefly the elastic wave launched at vector 12 travels transversely through body 10. Provided the body has sufficient elasto-optic properties, the elastic wave sets up a periodic variation in the index of refraction of the medium. If the medium is sufficiently transparent to beam 20, the beam will be diffracted to produce a first order lobe defined by the relationship known as the Bragg angle, such that $$\sin \theta = \frac{\lambda_o}{2\Lambda n} \quad (1)$$

where $\lambda_o$ is the optical wavelength in free space, $n$ is the index of refraction of the material of body 10, and $\Lambda$ is the grating spacing equal to the elastic wavelength.

Now it can readily be seen that Equation 1 defines a different angle for each wavelength making up beam 14. Thus, if the beam is polychromatic Equation 1 can be met for only one color and the other colors will be deflected at different angles, spreading a given spot and separating it into its spectral components. This is highly undesirable in certain applications as set forth hereinbefore.

In accordance with the invention body 10 is particularly shaped to take advantage of its variation of index of refraction with frequency and to produce frequency varying refractions at its input and output faces 17 and 18, respectively, which compensate the inherent dispersion of the deflection mechanism. In particular body 10 has a generally trapezoidal shape which provides input and output faces 17 and 18 that are at acute angles $\theta_u$ and $\theta_w$, respectively, to axis 13. Beam 14 is then directed upon face 17 with an angle of incidence $\theta_i$ measured between the beam and the normal to face 17. The angle of refraction $\theta_i'$ is given by $$\theta_i' = \sin^{-1}\left(\frac{\sin \theta_i}{n}\right) \quad (2)$$

By simple geometry based on FIG. 1

$$\theta = \theta' - \theta_u \quad (3)$$

The conditions which must obtain in order that the Bragg angle of Equation 1 may be satisfied at any wavelength are formed by substituting Equations 2 and 3 in Equation 1 to obtain:

$$\sin\left[\sin^{-1}\left(\frac{\sin \theta_i}{n}\right) - \theta_u\right] = \frac{\lambda_o}{2\Lambda n} \quad (4)$$

Recognizing that the optical wavelength $\lambda_o$ is much smaller than the elastic wavelength $\Lambda$ and that the sine of the incident angle is much smaller than the index of refraction, Equation 4 may be rewritten with second and higher order terms dropped as $$n^3 \sin \theta_u = \left(n^2 + \frac{\lambda_o}{4\Lambda} - \frac{\lambda_o^2}{8\Lambda^2}\right) \sin \theta_i - \frac{n^2\lambda_o}{2\Lambda} \quad (5)$$

Correction in accordance with the invention is obtained by recognizing that the index of refraction varies approximately linearly with wavelength. Thus, $\lambda_0 + \delta\lambda$ may be substituted for $\lambda_0$ if $n_0 + A\delta\lambda$ is substituted for $n$ in Equation 5 where $n_0$ is the value of $n$ at $\lambda_0$ and $\delta\lambda$ represents a change in wavelength that produces a change in $n$ of $A\delta\lambda$. Substituting and dropping second and higher order terms gives $$n_o^2(n_o + 3A\delta\lambda_o) \sin \theta_u = \left[n_o(n_o + 2A\delta\lambda_o) + \frac{1}{4\Lambda}(\lambda_o + \delta\lambda)\right.$$
$$\left. - \frac{1}{8\Lambda^2}(\lambda_o^2 + 2\lambda_o\delta\lambda)\right] \sin \theta_i$$
$$- \frac{1}{2\Lambda}\left[n_o^2\lambda_o + (n_o^2 + 2n_o\lambda_o A)\delta\lambda_o\right] \quad (6)$$

The value of $\theta_u$ and $\theta_i$ may now be found which will make Equation 6, and therefore, the Bragg angle of Equation 1, independent of the wavelength change of $\delta\lambda$. This is true if Equation 6 is satisfied separately by the terms involving $\delta\lambda$ and by terms independent of $\delta\lambda$. Thus Equation 6 may be divided into the two separate equations $$3n_o^2 A \sin \theta_u = \left(2n_o A + \frac{1}{4\Lambda} - \frac{\lambda_o}{4\Lambda^2}\right) \sin \theta_i - \frac{n_o^2 + 2n_o\lambda_b A}{2\Lambda} \quad (7A)$$

and $$n_o^3 \sin \theta_u = \left(n_o^2 + \frac{\lambda_o}{4\Lambda} - \frac{\lambda_o^2}{8\Lambda^2}\right) \sin \theta_i - \frac{n_o^2\lambda_o}{2\Lambda} \quad (7B)$$

Solving Equations 7A and 7B simultaneously for $\sin \theta_i$ and $\sin \theta_u$ and simplifying as before $$\sin \theta_i = \left(\frac{\lambda_o}{\Lambda} - \frac{n_o}{A\Lambda}\right)\left(2 + \frac{3\lambda_o}{2n_o^2\Lambda} - \frac{1}{2\Lambda A n_o}\right)^{-1} \quad (8)$$

and $$\sin \theta_u = \frac{1}{n_o}\left(1 + \frac{\lambda_o}{4n_o^2\Lambda}\right) \sin \theta_i - \frac{\lambda_o}{2n_o\Lambda} \quad (9)$$

With the values of $\theta_i$ and $\theta_u$ specified in Equations 8 and 9, every frequency in the input beam intercepts the diffraction grating plane at an angle satisfying the Bragg relationship of Equation 1. After deflection, however, each frequency still leaves the grating by a different angle.

In accordance with a further aspect of the invention the output face 18 of body 10 is formed with specific angles $\theta_w$ and $\theta_o'$ to the direction of propagation of the elastic wave forming the grating and to the exiting beam, respectively, to cause realignment of the deflected rays into a collimated beam. Neglecting for the moment any Doppler frequency change in the output beam $$\theta_o' = \theta_w + \theta_b$$

or $$\theta_o' = \theta_w + \frac{\lambda_o}{2\Lambda n}$$

Then, since $$\theta_o = \sin^{-1}(n \sin \theta_o')$$

we have $$\sin \theta_o = n \sin\left(\theta_w + \frac{\lambda_o}{2\Lambda n}\right) \quad (10)$$

If we let $$\lambda_o \rightarrow \lambda_o + \delta\lambda$$
$$n \rightarrow n_o + A\delta\lambda$$

in (10) and expand—assuming that $\lambda_o/2\Lambda n_o \ll 1$—we find that the condition for beam alignment is:

$$\tan \theta_w = -\frac{1}{2A\Lambda} \quad (11)$$

and then $$\sin \theta_o = \frac{\cos \theta_w}{2\Lambda}\left(\gamma_o - \frac{n_o}{A}\right) \quad (12)$$

Referring now to FIG. 2 a specific embodiment of the invention meeting the foregoing requirements is shown comprising a block 20 of a melt grown single domain crystal of lithium metaniobate having a chemical composition $LiNbO_3$. This material has a refractive index $n = 2.323$ which varies within 0.5 percent of linear at a rate $A = -4.25 \times 10^{-3}$ in the optical range centered on $5.5 \times 10^{-5}$ centimeters. For an elastic wave of 718 megacycles having a wavelength $\lambda$ in the material of $1 \times 10^{-3}$ centimeters, calculations according to the foregoing equations render $\theta_i = 16.9°$, $\theta_u = 6.55°$, $\theta_w = 6.75°$, and $\theta_o = 17.5°$.

The piezoelectric properties of body 20 are employed to generate an elastic wave at microwave frequencies propagating in the direction represented by axis 21 by applying microwave energy from source 22 by way of coaxial conductor 23 to a probe 24 contacting the surface of body 20. The outer conductor of coaxial 23 is connected to a suitable conductive ground plane 25, spaced from and at least partially surrounding probe 24. The electric field gradient thus set up on the surface of block 20 generates an elastic wave propagating normally away from the exited surface. A coating 26 of acoustically absorbent material such as lead, solder or plastic tape is located upon the opposite face of body 20.

The orientation shown in FIG. 2 is that for an acoustical beam advancing upon the optical beam which produces a Doppler shift that increases the frequency of the output beam by the frequency of the elastic wave. By reversing the positions of the input transducer and coating 26 the elastic wave moves in the same direction as the optical beam to produce an output which is shifted down in frequency.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A color compensated Debye-Sears optical diffraction grating cell wherein the body of said cell is generally trapezoidal in a first cross-sectional plane normal to the plane of the grating therein, a first face of said trapezoid being tilted at an acute angle to the plane of the grating therein, means for directing a multifrequency optical beam into said body through said first face at different acute angles to both said face and said grating plane such that refraction at said face causes every frequency in said beam to intersect said grating plane at angles that are substantially similar functions of frequency, said body having a second face through which said beam exits from said body that is tilted by different acute angles to both said given direction and said exiting beam such that refraction at said second face causes every frequency in said beam to leave said face at substantially equal angles thereto.

2. An optical beam deflecting arrangement comprising a body of material having an index of refraction which varies with frequency, means for producing a diffraction grating in the form of a periodic variation of said index extending in a given direction within said body, said body having a first face that is tilted at an acute angle to said given direction, means for directing said beam into said body through said first face at a different acute angle to said face and to said given direction such that the acute angles between each frequency component of said beam and said given direction are substantially the same function of the ratio of the wavelength of that component to said index of refraction at that wavelength, said body having a second face through which said beam exits from said body that is tilted by different acute angles to both said given direction and said exiting beam such that each frequency component of said beam exits substantially in parallel from said second face in a collimated beam.

3. Deflecting arrangement for a broadband optical beam of center wavelength $\lambda_o$ comprising a body of material having an index of refraction $n$ which varies with frequency at a rate A, means for launching an elastic wave of wavelength $\Lambda$ traveling in a given direction within said body, said body having a first face that is tilted at an angle of substantially $\theta_u$ to said given direction, means for directing said beam into said body through said first face at an angle of substantially $\theta_i$ to the normal of said face, said body having a second face through which said beam exits from said body that is tilted by an angle of substantially $\theta_w$ to said given direction and the normal thereof by substantially $\theta_o$ to said exiting beam wherein $$\sin \theta_i = \left(\frac{\lambda_o}{\Lambda} - \frac{n_o}{A\Lambda}\right)\left(2 + \frac{3\lambda_o}{2n_o^2\Lambda} - \frac{1}{2\Lambda A n_o}\right)^{-1}$$

$$\sin \theta_u = \frac{1}{n_o}\left(1 + \frac{\lambda_o}{4n_o^2\Lambda}\right)\sin \theta_i - \frac{\lambda_o}{2n_o\Lambda}$$

$$\tan \theta_w = -\frac{1}{2A\Lambda}$$

and $$\sin \theta_o = \frac{\cos \theta_w}{2\Lambda}\left(\lambda_o - \frac{n_o}{A}\right)$$

No references cited.

RONALD L. WIBERT, Primary Examiner

E. BAUER, Assistant Examiner

U.S. Cl. X.R.

332—7.51; 350—161, 162